May 21, 1963  G. M. PRO  3,090,593
SHUT-OFF VALVE FOR CEMENTITIOUS PRESSURE VESSELS
Filed Dec. 18, 1958  2 Sheets-Sheet 1

INVENTOR.
George M. Pro
ATTORNEY

May 21, 1963 G. M. PRO 3,090,593
SHUT-OFF VALVE FOR CEMENTITIOUS PRESSURE VESSELS
Filed Dec. 18, 1958 2 Sheets-Sheet 2
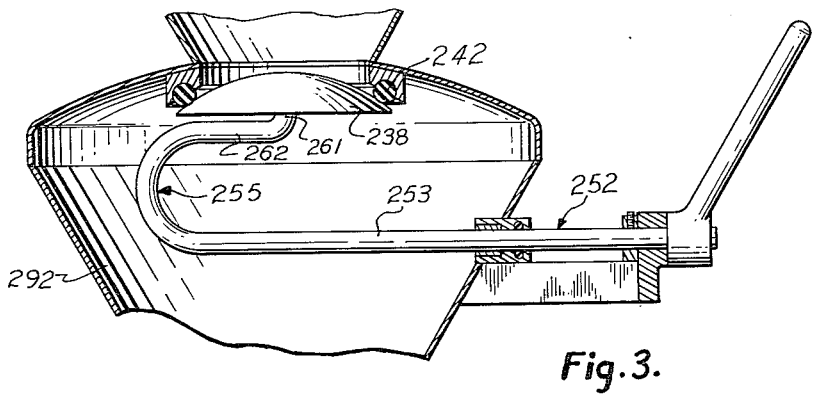
Fig. 3.
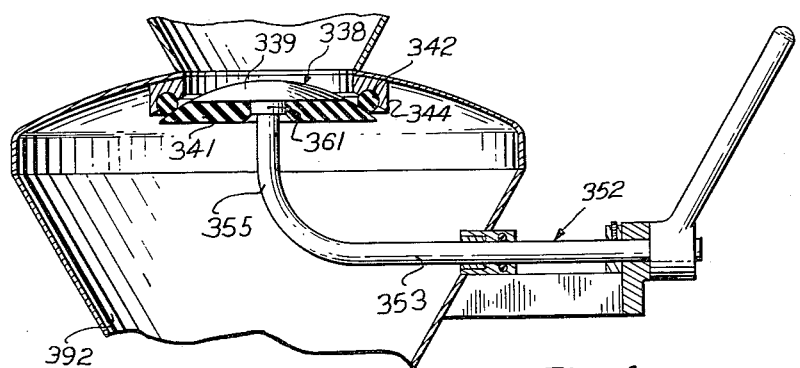
Fig. 4.
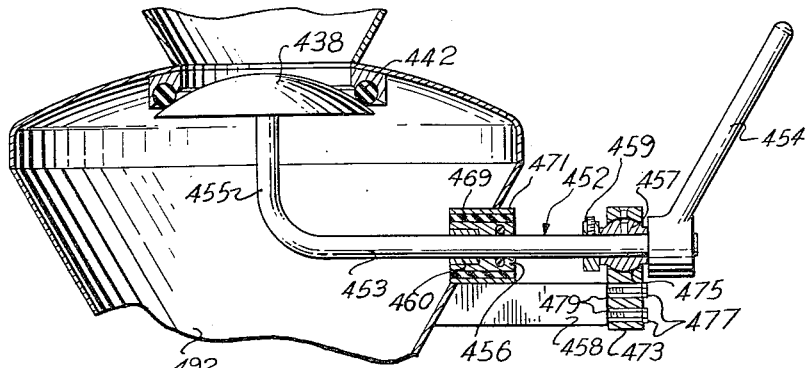
Fig. 5.
INVENTOR.
George M. Pro
BY 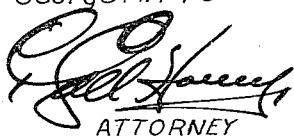
ATTORNEY United States Patent Office 3,090,593
Patented May 21, 1963

3,090,593
SHUT-OFF VALVE FOR CEMENTITIOUS
PRESSURE VESSELS
George M. Pro, Leawood, Kans., assignor to Air Placement Equipment Company, Kansas City, Mo., a corporation of Missouri
Filed Dec. 18, 1958, Ser. No. 781,322
2 Claims. (Cl. 251—87)

This invention relates to a machine for handling particulate material such as concrete, sand, gravel and the like through use of one or more pressure hoppers requiring proper sealing of the inlet port through use of a valve which may be readily and easily moved to and from the closed position without appreciable interference by the materials through which the valve must operate.

This is a continuation-in-part of my copending application Serial No. 492,397 filed March 7, 1955, now U.S. Letters Patent 2,949,275, issued August 16, 1960, entitled, "Valve Mechanism for Cement Gunning Machines," it being a primary object of the instant invention to improve upon the valve mechanism therein disclosed and claimed.

While the valve mechanism of the above-mentioned application has proved satisfactory in all respects, it has been found that the principles thereof might be effected equally well through various other means having the additional advantages of ease of construction, simplicity, reduced costs of manufacture, long lasting and ease of repair, the most important object of the instant invention therefore consisting of the provision of such attributes in a shut-off valve embodying the broad principles of my previous disclosure.

Another important object of the present invention is to provide a shut-off valve for cementitious pressure vessels having a shaft mounting for the valve itself which extends into the vessel at one point only, thereby eliminating the necessity of completely traversing the vessel with the shaft as in my prior invention, and making it possible to provide a floating arrangement for the valve toward its seat under influence of the pressure within the vessel in a manner differing from the reciprocable and rectilinear movement of the valve disclosed in the said application above identified.

Still another important object of the present invention is to provide a shut-off valve that is mounted in a manner to permit its swinging movement toward and away from the seat to the end that the pressure in the vessel acts on the valve and holds the same properly sealed with respect to the resilient seat adjacent the inlet port of the pressure hopper.

In the drawings:

FIG. 3 is a view similar to FIG. 2 illustrating a modified form of the invention.

FIG. 4 is a view similar to FIGS. 2 and 3 showing still another embodiment of the instant invention; and FIG. 5 is a view similar to FIGS. 2, 3 and 4 and depicting still another form of the instant invention.

Figure 2:
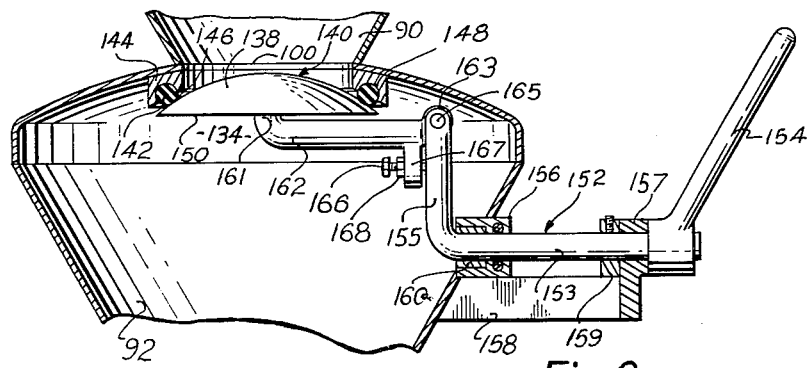
FIG. 2 is a fragmentary, vertical, cross-sectional view taken at right angles to FIG. 1 and showing the uppermost valve in a closed position.
Figure 1:
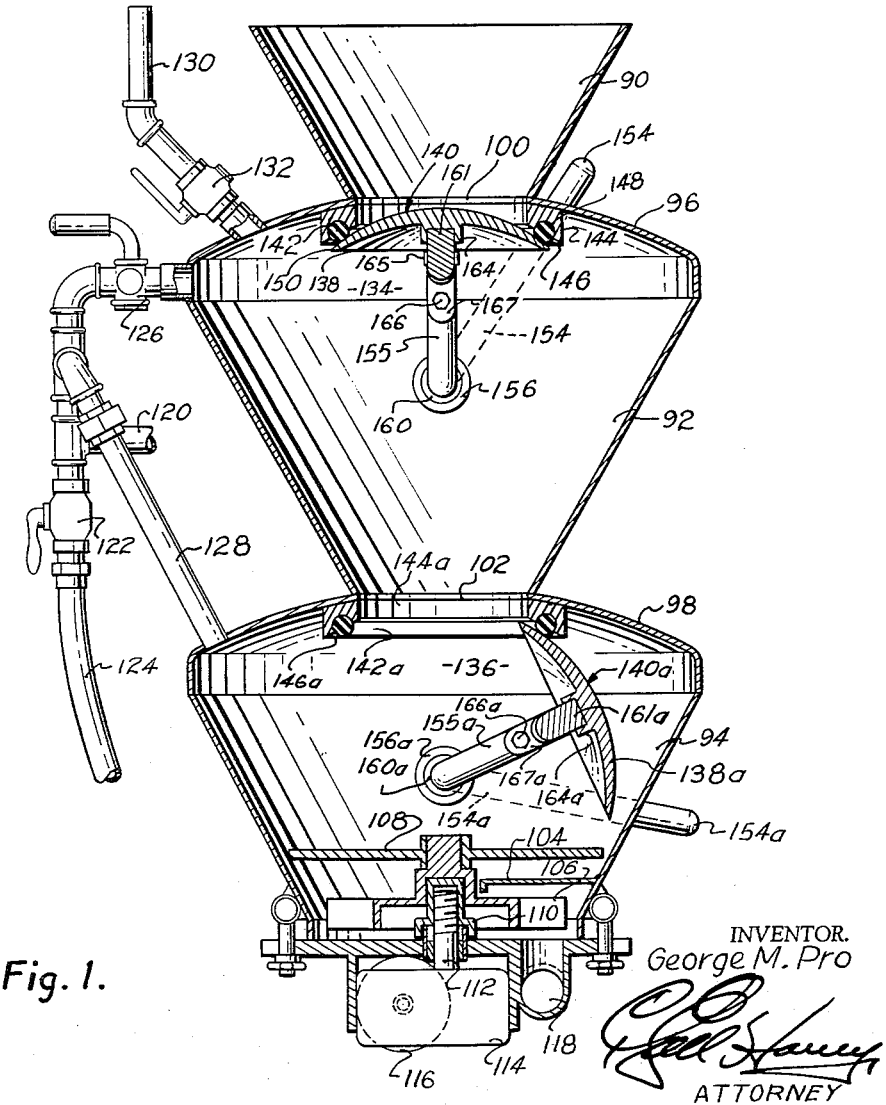
FIGURE 1 is a vertical, cross-sectional view through a gunning machine showing one type of shut-off valve made pursuant to the present invention and illustrating one of such valves closed, with the other valve open.

The machine shown by FIGS. 1 and 2 of the drawings and chosen for illustration of one form of valve or closure mechanism of the instant invention, consists of three conical hoppers 90, 92 and 94 superimposed and in communicating relationship. Hoppers 92 and 94 are provided with dome-shaped tops 96 and 98, respectively, that are in turn provided with inlet ports 100 and 102, respectively, and the lowermost open ends of hoppers 90 and 92 register directly with ports 100 and 102, respectively.

The lowermost hopper 94 is provided with a stationary shelf 104, and a feed wheel 106 together with an agitator 108 are operably mounted on a driving stud 110. The stud 110 is in turn attached to a shaft 112 emanating from a gear box 114 and rotated by a suitable prime mover such as an air motor 116. Cementitious materials within the hopper 94 are delivered to a position beneath the shelf 104 and thence into a discharge 118.

Compressed air is directed to the system through a pipe 120 coupled with a suitable source of air pressure (not shown) through pressure regulators and the like, which compressed air flows through a valve 122 when the latter is opened and thence through a hose 124 to the discharge 118, and finally through a material-receiving hose, not shown, to the atmosphere for high velocity placement of the material on any surface to be coated therewith.

Compressed air also enters the hopper 92 through a valve 126 when the latter is opened, and into the hopper 94 through a pipe 128. An outlet pipe 130 communicating with the hopper 92 exhausts the system of compressed air upon opening of a control valve 132. The material to be handled through use of a machine of this type is initially fed into the open top hopper 90.

The valving or closing mechanisms broadly designated by the numerals 134 and 136 for ports 100 and 102, respectively, are identical and therefore the same identifying numerals will hereinafter be employed and differentiated by use of the letter "a" with respect to the component parts of valve mechanism 136. Valve head 138 consists of a segment of a hollow sphere presenting therefore a convex uppermost surface 140 that cooperates with a seat or seal 142 to close the port 100 when valve head 138 is in the position illustrated in FIGS. 1 and 2 of the drawings.

A ring 144 mounted on the innermost face of top 96 of hopper 92 in concentric relationship to the port 100 has a frusto conical innermost edge 146 provided with a circular groove 148 that is semicircular or slightly greater than semicircular in cross-sectional configuration for receiving the seal 142. Seal 142 is in the nature of a continuous circular O-ring of compressible material such as rubber and remains seated within the groove 148 without need of additional attachment thereof to the ring 144.

Consequently, when the seal 142 becomes sufficiently worn to require replacement it can easily be slipped from place and a new seal or seat 142 snapped into place within the groove 148.

The diameter of the sealing member 142 should be slightly less than the diameter of the valve head 138 at its circular peripheral edge 150 so that the valve head 138 engages the sealing member 142 throughout the length of the latter when the valve head 138 is closed. In such position the valve head 138 extends upwardly into the ring 144 since the diameter of the sealing member 142 is greater than the minimum diameter of ring 144 and the diameter of port 100.

Valve head 138 is carried by a shaft 152 having a horizontal component 153 and a lateral extension 155 integral with one end of the component 153 and disposed within the hopper 92. A handle 154 secured rigidly to the shaft 152 exteriorly of the hopper 92 is manually manipulable to rotate the component 153 of shaft 152 and the extent of swinging movement of handle 154 may be limited through use of any suitable stops (not shown).

The portion 153 of shaft 152 is carried by a pair of spaced bearings 156 and 157, bearing 156 being secured to hopper 92 and bearing 157 forming a part of a bracket 158 extending laterally from the outer surface of hopper 92.

A set collar 159 on the shaft 152 cooperates with handle 154 in preventing the portion 153 from reciprocating horizontally. A fluid tight seal 160 carried by the bearing member 156 tightly surrounds the horizontal component 153 of shaft 152.

A substantially U-shaped arm 162 within the hopper 92 has a leg 161 at one end thereof that is tightly fitted within a tubular stud 164 forming a part of the valve head 138. Another short leg 163 at the opposite end of the arm 162 couples with the free end of the lateral extension 155 through the medium of a pivot pin 165.

It is thus seen that when the valve head 138 is closed it is adapted to swing with the arm 162 toward and away from the seal 142. The extent of inward swinging movement of the valve head 138 is limited, however, by a pin 166 that is threaded in a boss 167 integral with the arm 162. One end of the pin or bolt 166 bears against the lateral extension 155 and a lock nut 168 on the bolt 166 holds the latter in selected positions, thereby permitting adjustment.

In normal operation valve head 138 is closed and valve head 138a is open as illustrated in FIG. 1. Valves 122 and 126 are both open and the exhaust valve 132 is closed. Under such conditions the hoppers 92 and 94 are pressurized equally and the valve head 138 is held tightly sealed against its seat 142 by such pressure within the system.

Material within the hopper 94 is fed to beneath the shelf 104 by agitator 108 and in turn fed to the discharge 118 by feeder 106 upon operation of the prime mover 116. Such material is forced from the discharge 118 to the material handling hose aforementioned by air pressure within the hose 124, it being understood that the latter is operably coupled with such material feeding hose.

While the valve head 138 is thus closed, additional material which consists of sand, cement and the like may be fed into the hopper 90 and ultimately fed to the hoppers 92 and 94 in the following manner, all without interrupting the continued placement thereof on surfaces being coated therewith.

Valve head 138a is first moved to the closed position seated against its seal 142a by manipulation of the handle 154a. Thereupon the valve 126 is closed and the valve 132 is opened to exhaust the air pressure from hopper 92. Pressure is maintained in the hopper 94 by virtue of the pipe 128 communicating with pipe 120 and such pressure within the hopper 94 acts upon the valve head 138a to hold the latter sealed tightly against the seat 142.

The valve head 138 is thereupon opened by swinging the handle 154. The material in hopper 90 is thereby permitted to drop into the hopper 92 whereupon the valve head 138 has again moved to the position engaging seat 142 and closing port 100.

Thereupon the operator closes valve 132 and opens the valve 126 thereby equalizing the pressure within hoppers 92 and 94 and causing the valve head 138 to seat tightly against the seal 142. The handle 154a may thereupon be again manipulated to open the valve head 138a. The material within the hopper 92 then drops through the port 102 and into the hopper 94.

It is particularly notable that the valve heads 138 and 138a may be swung to and from their closed positions without the necessity of waiting until the respective hoppers are clear of the cementitious materials. They act as slide valves and the relatively sharp peripheral edges 150 and 150a thereof effectively "cut" or slide through the material without appreciable resistance. It is unnecessary to exercise care in maintaining the valve mechanisms clean before closing in order to avoid leakage. The smooth, slick, convex surfaces 140 and 140a cooperating with the resilient seats 142 and 142a effectively prevent lodgment of the particles of the materials between the seats and the valves such as to prevent the establishment of an airtight closure for the ports 100 and 102.

The extent of drag or frictional engagement between the surfaces 140 and 140a and their seats 142 and 142a may be adjusted by manipulation of the bolts 166 and 166a thereby limiting the extent of swinging movement of the valves and their arms 162 away from the seats 142 and 142a. After adjustment the lock nuts 168 and 168a may be tightened to hold the pins 166 and 166a. These pins or bolts have no effect, however, upon the free swinging movement of the valves toward their corresponding seats 142 and 142a. Therefore, when the hoppers 92 and 94 are pressurized, the valves will be forced tightly into closed positions as above indicated.

Since there is no differential pressure upon the valve heads 138 and 138a during manipulation thereof to and from their closed positions they will slide through the material with respect to the seals 142 and 142a without difficulty.

In the form of my invention illustrated in FIG. 3 the horizontal component 253 of shaft 252 is rotatably mounted in the same manner as above described with respect to shaft 152 in FIGS. 1 and 2. The innermost end of the shaft 252 is provided with a resilient, substantially U-shaped loop 255 that is integral with the horizontal portion 253 and provided with an arm 262 that is substantially parallel with the horizontal portion 253. A short leg 261 integral with the arm 262 and extending laterally therefrom is affixed to the valve head 233 in the same manner as indicated in FIG. 1 of the drawings.

It can therefore be seen that by virtue of the inherent resiliency of the shaft 252 and particularly the loop 255 thereof, valve head 238 is free to move toward the resilient seat 242 in response to the internal pressure within hopper 292. As such pressure tends to swing the valve head 238 toward the seat 242 when the valve 238 is closed arm 262 swings away from the horizontal portion 253 of shaft 252 as the bight of the loop 255 flexes.

In FIG. 4 of the drawings there is illustrated still another arrangement permitting flexing of valve head 338 with respect to horizontal component 353 of shaft 352. In this embodiment the shaft 352 is provided with a lateral extension 355 and it is to the innermost end of the extension 355 that valve head 338 is operably attached.

Valve head 338 has two components 339 and 341, the former of which is made from essentially non-resilient material and has attachment directly and rigidly to the proximal end of the lateral extension 355. The portion 341 of the valve head 338 is, however, made from resilient material such as rubber and is affixed to the portion 339 in any suitable manner. The resilient portion 341 surrounds the tubular boss 361 of valve portion 339 into which the lateral extension 355 extends as above described and illustrated in FIG. 1 of the drawings.

The rigid part 339 of valve head 338 does not engage seat 342 when the valve head 338 is closed as shown in FIG. 4; instead, it is disposed within the ring 344, permitting only the disc-like resilient portion 341 to engage the seat 342. By such arrangement the portion 341 of the valve head 338 is free to flex with respect to the lateral extension 355 toward and away from the seat 342. Accordingly, the internal pressure within hopper 392 will effectively hold the valve portion 341 seated tightly against the resilient seal 342. The top portion 339 of the valve head 338 serves to limit the extent of upward swinging movement of the valve portion 341 under influence of the pressure within the hopper 392.

FIG. 5 of the drawings illustrates a shaft 452 having essentially the same substantially L-shaped configuration as the shaft 352 presenting a lateral extension 455 to which valve head 438 is directly and rigidly attached. The horizntal component 453 of the shaft 452 is provided with a bearing member 456 similar to the bearing 156 shown in FIG. 2 and carrying a seal 460 around the shaft portion 453. The bearing member 456 is, however, mounted within a resilient collar 469 that is in turn housed within a sleeve 471 rigidly secured to hopper 492.

A self-aligning bearing 457 for shaft portion 453 is disposed between handle 454 and set collar 459. Bracket 458 on hopper 492 carries a block 473 provided with a socket 475 within which the bearing 457 is free to swing. Fasteners 477 attaching the block 473 to the bracket 458 pass through enlarged openings 479 in the block 473, thereby permitting adjustment of the bearing 457 as block 473 is shifted relative to the bracket 458 when the fasteners 477 are loosened.

In this embodiment of the invention it is apparent that the valve head 438 is free to swing toward and away from the seat 442 since the horizontal component 453 of shaft 452 can shift in all directions as permitted by the resilient collar 469. Component 453 of shaft 452 actually swings during such movement of the valve head 438 because of the fact that the bearing 457 is adapted to rotate within its socket 475. Here again, the internal pressure within the hopper 492 will maintain the valve head 438 tightly against the seat 442 as sleeve 469 and bearing 457 permit the shaft 452 to swing upwardly in response to the said internal pressure in hopper 492.

Having thus described the invention what is claimed as new and desired to be secured by Letters Patent is:

1. In a machine for handling particulate material, the combination of a pressure hopper for said material having a material inlet port and an annular seat in the hopper adjacent the port; a valve in the hopper having a convex outer face shaped substantially in conformity with a sector of a sphere, said outer face normally bearing against the seat in closing relationship to the port; a shaft carried by the hopper for rotation relative thereto about an axis spaced from said port; an arm; and means mounting said arm on said shaft for movement relative to the latter, said arm being secured to the valve for moving the latter along a circular path to and from a position clearing and thereby opening the port as the shaft is rotated, said arm being swingable relative to the shaft about an axis disposed angularly with respect to the axis of rotation of the shaft and in a direction to move said valve toward the seat when the valve is closed, whereby pressure in the hopper holds the valve tightly against the seat, said seat being resilient whereby material becoming lodged between the seat and the valve when the latter is closed is pressed into the seat by said pressure in the hopper acting on the valve, thereby maintaining a seal around the seat.

2. In a machine for handling particulate material, the combination of a pressure hopper for said material having a material inlet port and an annular seat in the hopper adjacent the port; a valve in the hopper having a convex outer face shaped in conformity with a sector of a sphere, said outer face normally bearing against the seat in closing relationship to the port; a shaft carried by the hopper for rotation relative thereto about an axis spaced from said port; an arm; means mounting said arm on said shaft for movement relative to the latter, said arm being secured to the valve for moving the latter along a circular path to and from a position opening the port as the shaft is rotated, said arm being swingable relative to the shaft in a direction toward the seat when the valve is closed, whereby pressure in the hopper holds the valve tightly against the seat, said seat being resilient whereby material becoming lodged between the seat and the valve when the latter is closed is pressed into the seat by said pressure in the hopper acting on the valve, thereby maintaining a seal around the seat, said shaft having a lateral extension receiving the arm; and adjustable means between the arm and the extension limiting the extent of movement of the valve away from the seat.

References Cited in the file of this patent

UNITED STATES PATENTS

| | | |
|---|---|---|
| 956,704 | Hepler | May 3, 1910 |
| 1,378,555 | O'Sullivan | May 17, 1921 |
| 1,784,381 | O'Stroske | Dec. 9, 1930 |
| 2,073,112 | Lindinger | Mar. 9, 1937 |
| 2,315,031 | Wiegand | Mar. 30, 1943 |
| 2,539,559 | Ward | Jan. 30, 1951 |
| 2,732,107 | Ridley | Jan. 24, 1956 |
| 2,949,275 | Pro | Aug. 16, 1960 |

FOREIGN PATENTS

| | | |
|---|---|---|
| 134,312 | Sweden | Jan. 22, 1952 |